United States Patent
Kanou et al.

(10) Patent No.: US 9,969,004 B2
(45) Date of Patent: May 15, 2018

(54) α+β OR β TITANIUM ALLOY AND METHOD FOR PRODUCING SAME

(75) Inventors: Osamu Kanou, Chigasaki (JP); Satoshi Sugawara, Chigasaki (JP); Hideo Takatori, Chigasaki (JP)

(73) Assignees: TOHO TITANIUM CO., LTD., Kanagawa (JP); SANYO SPECIAL STEEL CO., LTD., Kyogo (JP)

( * ) Notice: Subject to any disclaimer, the term of this patent is extended or adjusted under 35 U.S.C. 154(b) by 615 days.

(21) Appl. No.: 14/361,305

(22) PCT Filed: Dec. 16, 2011

(86) PCT No.: PCT/JP2011/079960
§ 371 (c)(1),
(2), (4) Date: May 29, 2014

(87) PCT Pub. No.: WO2013/080390
PCT Pub. Date: Jun. 6, 2013

(65) Prior Publication Data
US 2014/0334964 A1 Nov. 13, 2014

(30) Foreign Application Priority Data

Nov. 29, 2011 (JP) .................................. 2011-260511

(51) Int. Cl.
*C22C 14/00* (2006.01)
*B22F 3/20* (2006.01)
(Continued)

(52) U.S. Cl.
CPC .............. *B22F 3/20* (2013.01); *B22F 1/0003* (2013.01); *B22F 3/14* (2013.01); *B22F 9/023* (2013.01);
(Continued)

(58) Field of Classification Search
CPC ......... B22F 3/20; C22C 14/00; C22C 1/0458; C22F 1/183
See application file for complete search history.

(56) References Cited

U.S. PATENT DOCUMENTS 5,409,518 A  4/1995  Saito et al.
5,520,879 A  5/1996  Saito et al.
(Continued)

FOREIGN PATENT DOCUMENTS

JP  2-290933 A  11/1990
JP  4-235232 A  8/1992
(Continued)

OTHER PUBLICATIONS

Office Action of JP Appln. No. 2011-260511 dated Jun. 5, 2015.
Takashi Saito et al, Development of High Performance Titanium Matrix Composite, R&D Review, vol. 29, No. 3 (1994.9).

*Primary Examiner* — Christopher Kessler
(74) *Attorney, Agent, or Firm* — Fitch, Even, Tabin & Flannery LLP

(57) ABSTRACT

Titanium alloy containing iron, that is, iron-containing titanium alloy having high strength and hardness in which iron in a composition which cannot be realized in a conventional method, is contained with no segregation, and is provided in lower cost. The α+β titanium alloy or β titanium alloy is produced by a forming process such as hot extrusion of titanium alloy powder containing 3 to 15 mass % of iron powder. The method for production of the α+β titanium alloy or β titanium alloy includes a step of mixing 3 to 15 mass % of iron powder and titanium alloy powder as the remainder, and a step of performing a forming process of hot extrusion on this powder mixture.

8 Claims, 3 Drawing Sheets

(51) Int. Cl.
  *C22F 1/18* (2006.01)
  *C22C 1/04* (2006.01)
  *B22F 1/00* (2006.01)
  *B22F 3/14* (2006.01)
  *B22F 9/02* (2006.01)
  *B22F 9/04* (2006.01)
  *C22F 1/00* (2006.01)
  *B22F 9/00* (2006.01)

(52) U.S. Cl.
  CPC .............. *B22F 9/04* (2013.01); *C22C 1/0458* (2013.01); *C22C 14/00* (2013.01); *C22F 1/18* (2013.01); *C22F 1/183* (2013.01); *B22F 2003/208* (2013.01); *B22F 2009/001* (2013.01); *C22F 1/00* (2013.01); *Y02P 10/24* (2015.11)

(56) References Cited

U.S. PATENT DOCUMENTS

| | | | |
|---|---|---|---|
| 6,117,204 A | * | 9/2000 | Saito .................. C22C 14/00 419/12 |
| 6,607,693 B1 | | 8/2003 | Saito et al. |
| 2010/0074795 A1 | | 3/2010 | Takahashi et al. |

FOREIGN PATENT DOCUMENTS

| | | | |
|---|---|---|---|
| JP | 5-9630 A | | 1/1993 |
| JP | 5-345937 A | | 12/1993 |
| JP | 7-278704 A | | 10/1995 |
| JP | 11-71621 A | | 3/1999 |
| JP | H11-092843 A | | 4/1999 |
| JP | 2000-219924 A | | 8/2000 |
| JP | 2002206124 A | * | 7/2002 |
| JP | 2002-332531 A | | 11/2002 |
| JP | 2008-133531 A | | 6/2008 |

* cited by examiner though it has inferior workability.

In view of such circumstances, Ti-4.5Al-3V-2Fe-2Mo alloy (so called "SP700") has been developed in order to improve workability of the 64 alloy. Furthermore, Ti-10V-2Fe-3Al (so called "10-2-3 alloy"), Ti-15V-3Cr-3Al-3Sn (so called "15-3-3-3 alloy") or the similar alloy has been developed in which strength is further improved while maintaining the 64 alloy elongation level. However, vanadium or iron is easily segregated in any of the alloys SP700, 10-2-3, 15-3-3-3, and therefore further improvement has been required.

Under such circumstances, alloys having new compositions have been developed in order to prevent elements added from being segregated during production of the ingot, while maintaining the effect of the elements added in SP700, 10-2-3, or 15-3-3-3, at the same level or more, such as Ti-5V-5Mo-3Cr alloy (so called "5-5-5-3 alloy"), Ti-5Al-2Fe-3Mo alloy (so called "TiX-523 alloy"), and Ti-5Al-4V-0.6Mo-0.4Fe alloy (so-called "Timetal54M alloy"). It is considered that these new composition alloys aim to maintain effects of the alloy elements added at the same level or more as an overall alloy, by containing molybdenum and chromium instead of reducing vanadium and iron which are easily segregated elements. Problems of segregation have been solved to some extent by the development of these new alloys; however, segregation of alloy elements during solidification is inevitable even in these new composition alloys.

A technique has been known in which the 64 alloy is produced by a powder metallurgy using metallic powder as a raw material in order to prevent the elements added from being segregated during production of ingots. In the case in which it is produced by the powder metallurgy, a powder mixture consisting of pure titanium powder and alloy element powder, or a powder mixture consisting of pure titanium powder and master alloy powder of element added seems to be typically used as a raw material (see below Patent Document 1 and Non-patent Document 1).

Patent document 1: Japanese Unexamined Patent Application Publication No. Hei05 (1993)-009630

Non-patent document 1: Toyota Central Institute R&D Review Vol. 29 (1994), (3), pp. 49-60, by Saito and Furuta These methods are called "blended elemental method", and they are technically established. However, in the blended elemental method, although sintered material having high quality can be obtained, costs are high, and it is limited in practical use.

Reasons for high costs in the blended elemental method are that titanium powder is expensive due to the expensive pure titanium material used therein and the master alloy powder is also more expensive than pure titanium powder. Therefore, reduction in cost has been required. Furthermore, titanium alloy which is produced by the blended elemental method is consolidated by a method called HIP (hot isostatic pressing) in many cases, this method also results in increased cost, and a method is required in which titanium alloy can be produced at lower cost. As is described, a method is required in which titanium alloy, such as 64 alloy, can be produced at lower cost.

SUMMARY OF THE INVENTION

An object of the present invention is to provide a titanium alloy containing iron among the titanium alloys mentioned above, that is, an iron-containing titanium alloy having high strength and hardness in which iron is contained with no segregation in a composition which cannot be realized by a conventional method. In addition, another object is to provide a method in which the titanium alloy is produced at lower cost than a conventional method.

As a result of various research in view of the above circumstances, the inventors have found that titanium alloy sintered material can be produced at low cost by the powder metallurgy rather than by a melting method, and using titanium alloy powder rather than using blended elemental method.

In order to produce the titanium alloy powder of raw material, titanium alloy scrap as a raw material can be made into titanium alloy powder by a HDH (hydrogenation-dehydrogenation) method. Since titanium alloy scrap that is generally available is of low price, it can be used as a raw material for the powder metallurgy without using pure titanium powder, alloy element powder or master alloy powder of an alloy material, production can be performed at low cost.

Furthermore, sintering of titanium alloy powder and shape forming into a bar can be performed at the same time by preparing a powder mixture in which iron powder is added to titanium alloy powder and by sintering this powder mixture with a forming process such as extrusion. As a result, the inventors have found that iron containing titanium alloy having a composition that cannot be produced by a conventional method can be produced at lower production cost with no segregation.

Furthermore, it was confirmed that the titanium alloy produced by the above method has higher strength and hardness than titanium alloy produced by a conventional melting method, and thus the present invention was completed.

That is, the α+β titanium alloy or β titanium alloy according to the present invention is produced by a forming process such as hot extrusion of titanium alloy powder containing 3 to 15 mass % of iron powder. It should be noted that the β type alloy includes nearly β type alloy, in the present invention.

In the α+β or β titanium alloy of the present invention, it is desirable that the titanium alloy powder except for the iron powder be produced from titanium alloy material by the HDH method.

In the α+β or β titanium alloy of the present invention, it is desirable that the titanium alloy powder used to produce the alloy be an alloy powder containing titanium, aluminum and vanadium.

In the α+β or β titanium alloy of the present invention, it is desirable that the average concentration of iron is within ±20% of average iron concentration of the alloy itself in the arbitrary range of 500 μm of the alloy.

The method for production of α+β or β titanium alloy of the present invention includes a step of mixing process of iron powder from 3 to 15 mass % and titanium alloy powder as the remainder, and a step of forming process by hot extrusion.

In the method for production of α+β or β titanium alloy of the present invention, it is desirable that the temperature of the forming process such as the hot extrusion be in a range of (β transformation temperature −100° C.) to (β transformation temperature +100° C.).

The titanium alloy produced by the method according to the present invention is an iron-containing titanium alloy in which the composition cannot be produced by a conventional method, there is no segregation of iron, and strength and hardness are superior to those of a conventional alloy. In addition, it can be produced at lower cost. As a result, it can be desirably employed in fields such as high strength mechanical parts, medical materials, and aircraft materials.

BEST MODE FOR CARRYING OUT THE INVENTION

The preferred Embodiment of the present invention is explained with reference to drawings below.

The α+β titanium alloy or β titanium alloy according to the present invention is characterized in that it is produced by a forming process of hot extrusion of titanium alloy powder containing 3 to 15 mass % of iron powder.

In the present invention, "the titanium alloy powder containing 3 to 15 mass % of iron powder" means a complex powder in which iron powder separately prepared is added to titanium alloy powder at 3 to 15 mass % in a case of titanium alloy powder not containing iron as an alloy element. In a case of titanium alloy powder containing iron as an alloy element, this means a complex powder in which iron powder separately prepared is added to titanium alloy powder so that the sum of the iron component of the originally contained and the added is in a range of 3 to 15 mass %.

In the present invention, as the titanium alloy powder not containing iron as an alloy element mentioned above, alloy powder containing titanium, aluminum and vanadium is desirably used. As a desirable example of such an alloy powder, Ti-6Al-4V alloy powder, Ti-3Al-2.5V alloy powder or the like may be mentioned. As the titanium alloy powder containing iron as an alloy element, Ti-10V-2Fe-3Al alloy (so called "10-2-3 alloy") powder, Ti-5Al-2Fe-3Mo alloy (so called "TiX-523 alloy) powder or the like may be mentioned.

In the present invention, it is desirable that the titanium alloy powder mentioned above be produced from titanium alloy scrap as a raw material by the HDH method.

Figure 1:
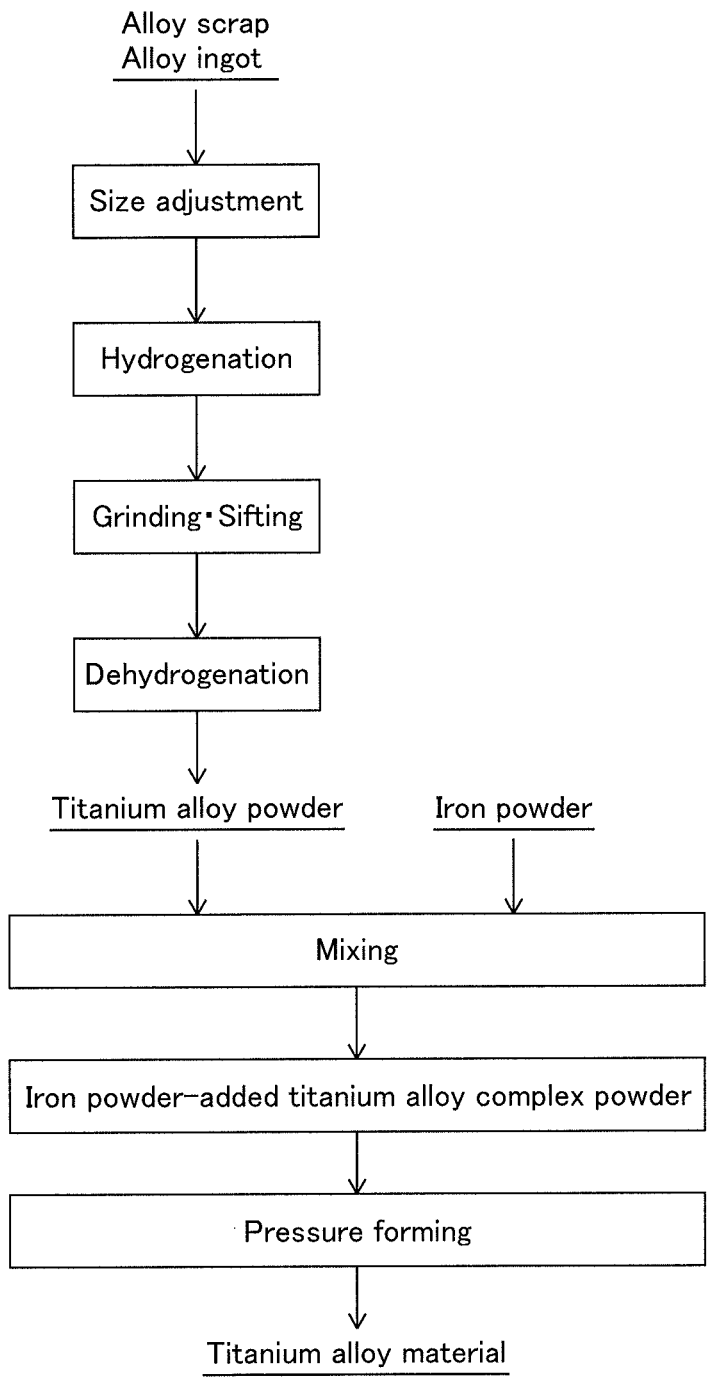
FIG. 1 is a flowchart diagram showing a method for production of the α+β or β titanium alloy of the present invention.
Figure 2:
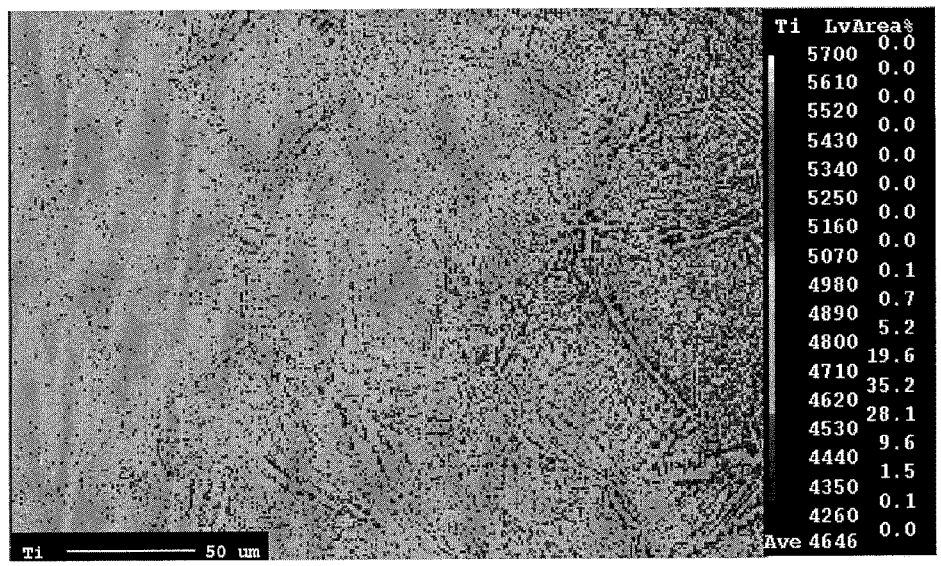
FIG. 2 is an EPMA photograph showing distribution of the element Ti in an Example.
Figure 3:
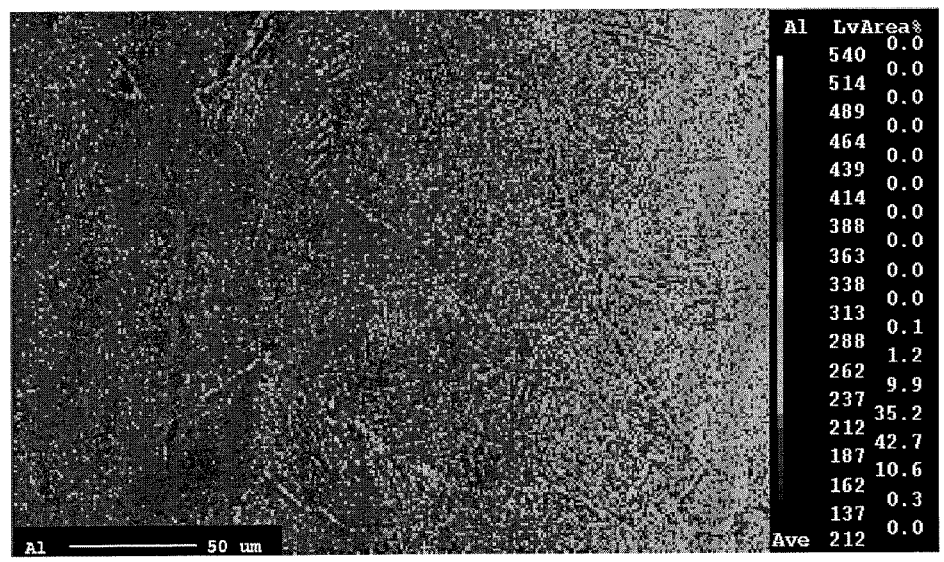
FIG. 3 is an EPMA photograph showing distribution of the element Al in an Example.
Figure 4:
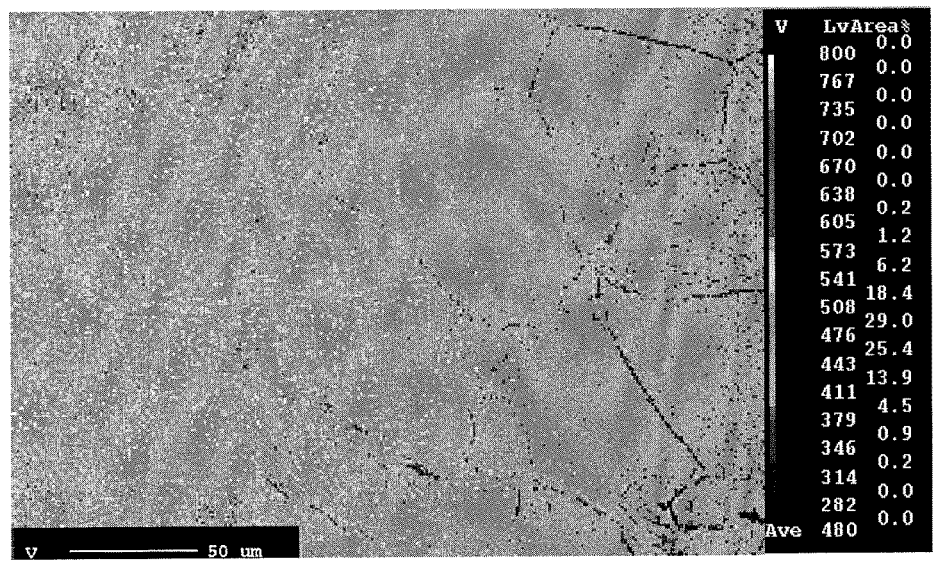
FIG. 4 is an EPMA photograph showing distribution of the element V in an Example.
Figure 5:
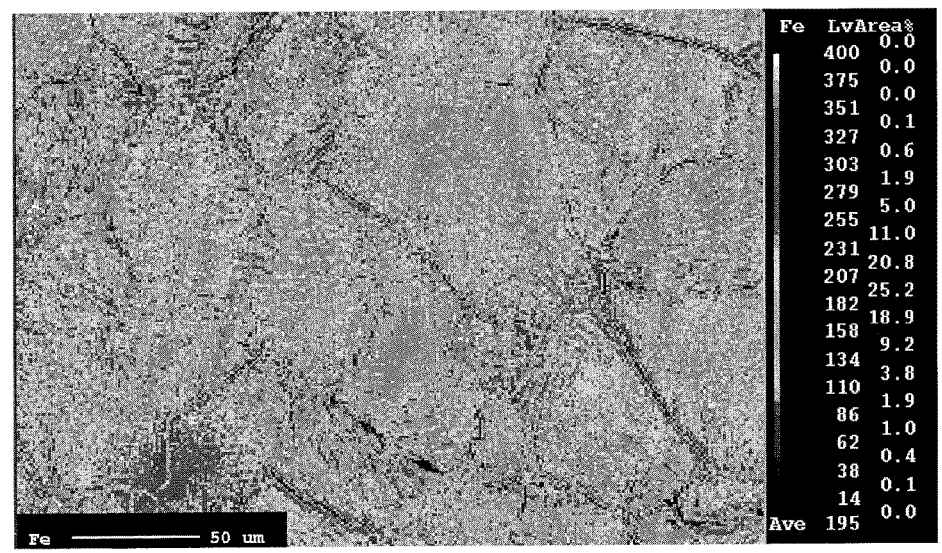
FIG. 5 is an EPMA photograph showing distribution of the element Fe in an Example.

FIG. 1 shows a process of desirable aspect of the production of titanium alloy according to the present invention by a flowchart diagram. In the present invention, it is desirable that titanium alloy scrap or titanium alloy ingot which originally contains desired components such as titanium alloy turning chips, titanium alloy forged pieces, end material of titanium alloy bar or the like be used as the titanium alloy raw material.

By using the alloy scrap material mentioned above as a raw material, production cost of titanium alloy powder can be effectively reduced.

It is desirable that these titanium alloy scrap or titanium alloy ingot (hereinafter simply referred to as "titanium alloy raw material") be preliminarily adjusted in size to a certain length or size.

For example, it is desirably cut to a length 100 mm or less first in a case of alloy turning chips. By cutting the length mentioned above, the hydrogenation process, which is the next process, can be effectively promoted. Furthermore, in the case of alloy scrap in block shape such as forged chips, it is not necessary to be processed preliminarily as long as it has a size that can be placed in a hydrogenating furnace. In the case in which the alloy raw material is titanium alloy ingot, it is desirable to be cut into turning chips.

The titanium alloy raw material, which is adjusted in size as mentioned above, is brought into hydrogenating treatment processing under a hydrogen atmosphere. It is desirable that the hydrogenating treatment be performed in a temperature range of 500 to 650° C. Since the hydrogenating reaction of the alloy raw material is an exothermic reaction, a temperature increasing operation by a heating furnace is not necessary accompanied by promoting of hydrogenating reaction, and hydrogenating reaction can be promoted automatically.

The titanium alloy raw material which is treated by hydrogenation (hereinafter simply referred to as "hydrogenated titanium alloy") is cooled to room temperature, and then it is desirably ground and sifted until it of predetermined particle size under an inert gas atmosphere such as argon gas.

Then, it is desirable that the hydrogenated titanium alloy powder, which is ground and sifted to a powder, be heated in a high temperature range under a reduced pressure atmosphere.

It is desirable that the dehydrogenating treatment be performed in a temperature range of 500 to 800° C. while evacuating. Since the dehydrogenating reaction is an endothermic reaction, which is the opposite reaction of the above hydrogenating reaction, heating operation is necessary until hydrogen is no longer generated from hydrogenated titanium alloy powder.

By performing the above-mentioned operations, the titanium alloy powder of the present invention can be obtained. It is desirable that the size of the titanium alloy powder of the present invention be adjusted in a range of 1 to 300 μm, and more desirably, in a range of 5 to 150 μm. There is a tendency for it to be difficult to increase density if the size is too coarse. On the other hand, bulk density may decrease, it may easily burn, and the content amount of oxygen may increase, if the size is too fine.

There is a case in which the titanium alloy powder obtained via the dehydrogenation treatment is mutually sintered, and in this case, it is desirable to perform grinding process.

The present invention is characterized in that iron powder is added to the titanium alloy powder produced by the above-mentioned method so that the content amount of iron is in a range of 3 to 15 mass %.

It is desirable that iron powder used that is added to the titanium alloy powder be adjusted size in a range of 1 to 300 μm. More desirably, iron powder in a range of 1 to 50 μm is used.

Since it is more advantageous to use finer iron powder when producing titanium alloy powder having uniform composition, it is desirable that iron powder be adjusted in size so that the average particle size (d50) is in a range of 2 to 10 μm, in the above range of particle size of 1 to 50 μm.

The present invention is characterized in that the iron powder-added titanium alloy powder obtained as mentioned above is further mixed uniformly, and then a forming process such as hot extrusion is performed. By performing the forming process as mentioned above, sintering and shape forming can be promoted at the same time in a short period.

In the present invention, it is desirable that the iron powder-added titanium alloy powder be filled in a metallic capsule and then be processed by a forming process.

By filling the iron powder-added titanium alloy powder in a metallic capsule and then performing the forming process to obtain sintered material, the sintered material is an iron-containing titanium alloy in which its composition cannot be produced by a conventional method, iron is not segregated, and strength and hardness are superior.

It is desirable that the temperature of the above forming process be in a range of (β transformation temperature −100° C.) to (β transformation temperature +100° C.). By heating the material that is to be processed preliminarily in the temperature range, operation of the forming process can be smoothly promoted.

In a case in which the forming process temperature is below (β transformation temperature −100° C.), deformation resistance of the material becomes large, the material cannot be processed completely, and the material may be undesirably clogged in a die in the case of extrusion. On the other hand, in a case in which the forming process temperature is over (β transformation temperature +100° C.), grain size of the forming process material may be undesirably coarse.

Therefore, it is desirable that the temperature of the forming process be in a range of (β transformation temperature −100° C.) to (β transformation temperature +100° C.).

Furthermore, in the present invention, in a case in which the forming process is performed in a temperature range of (β transformation temperature −100° C.) to (β transformation temperature), that is, in an α+β region, since structure after the forming process is made finer, desirable alloy not only having strength and hardness but also having good balance of tensile strength and elongation can be produced.

In the present invention, by performing the forming process in a temperature range of (β transformation temperature) to (β transformation temperature +100° C.), not only are strength and hardness high, but also high temperature strength, creep resistance characteristics, fracture toughness, and fatigue crack propagation characteristics are superior.

The titanium alloy according to the present invention contains iron of composition of 3 to 15 mass % which cannot be produced by a conventional ingot melting method, and it is characterized in that an average value in which concentration of iron in the titanium alloy is averaged in a range of 500 μm, is within ±20% versus a nominal value of the material.

Desirable conditions of the forming process to realize the above mentioned characteristics are explained as follows. First, the titanium alloy powder and the iron powder for an object composition are prepared. These are mixed so as to be a predetermined content amount of iron, the powder mixture is inserted in a metallic capsule, and the hot forming process is performed. Temperature of the forming process such as hot extrusion is in a range of (β transformation temperature −100° C.) to (β transformation temperature +100° C.).

In the present invention, it is desirable that a ratio of cross sectional area of the material to be processed versus cross sectional area of the capsule (hereinafter simply referred to as "processing ratio") be in a range of 1/10 to 1/30. By setting the processing ratio in the above range, extent of flow of the material can be controlled, forge degree of the forming process material can be adjusted, and more desirable mechanical characteristics can be imparted.

In the present invention, the capsule that covers the titanium alloy material produced by the above method can be removed by cutting and acid washing.

The titanium alloy material from which the capsule is removed by the above method can be again heated to a high temperature in a vacuum atmosphere.

Since strength of the titanium alloy material processed as mentioned above is extremely superior and the material has extremely few lattice defects, it can be appropriately used for a structure material of, for example, high strength mechanical parts.

That is, not only is the strength of the iron-containing titanium alloy material of the present invention a 10% to 50% higher value compared to a conventional titanium alloy not containing iron, but also raw material cost can be reduced since titanium alloy scrap is used as the raw material, and as a result, the cost of the titanium alloy material which is the final product can be 50% to 70% reduced compared to a conventional case. Furthermore, in the titanium alloy material of the present invention, hardness also exhibits a 10% to 70% higher value compared to a material not containing iron.

The titanium alloy according to the present invention has superior mechanical characteristics as mentioned above, and as a result, it can be appropriately applied to not only accurate mechanical parts for industrial use, but also to medical materials, and furthermore, to aircraft parts to which strength and wear-resistance are required.

It should be noted that although the iron-containing titanium alloy can be produced by a melting method, there is a large degree of segregation, and it is difficult to produce a practical alloy.

In the titanium alloy material produced in the present invention, it is desirable that at least aluminum and vanadium be contained, and in addition, molybdenum, iron, chromium and/or tin can be contained in appropriate amount. Typical alloys containing these elements are mentioned below. In a case in which titanium alloy powder before mixing with iron powder already contains iron as a component element, it is desirable that the sum of content amount of iron before addition and the content amount of iron after addition be in a range of 3 to 15 mass %.

Ti-(5.1 to 5.8)% Al-(3.4 to 3.9)% V-(3 to 15)% Fe alloy,
Ti-(2.6 to 3)% Al-(8.7 to 9.9)% V-(3 to 15)% Fe alloy,
Ti-(2.6 to 2.9)% Al-(12.8 to 14.6)% V-(2.6 to 2.9)% Cr-(2.6 to 2.9)% Sn-(3 to 15)% Fe alloy,
Ti-(3.9 to 4.5)% Al-(2.6 to 3)% V-(1.7 to 2)% Mo-(3 to 15)% Fe alloy,
Ti-(4.3 to 4.9)% Al-(2.6 to 3)% Mo-(3 to 15)% Fe alloy,
Ti-(4.3 to 4.9)% Al-(3.4 to 3.9)% V-(0.5 to 0.6)% Mo-(3 to 15)% Fe alloy, tance of each of the samples was measured at the β transformation temperature and at temperatures near the β transformation temperature. The test pieces were heated in argon gas atmosphere while measuring electric resistance by the four terminal method, and a temperature at which electric resistance no longer varied was regarded as the β transformation temperature. As the measuring device, electric resistance measuring device ARC-TER-1 type was used.

Next, deformation resistance of the alloy was measured at temperatures which were considered to be candidates for the forming processing temperature. The measurements were performed by compression testing using a hot processing duplicating device (Thermec Master). These are shown in Table 1 together with the results of measuring the β transformation temperature.

TABLE 1

| Fe content amount | β transformation temperature | Deformation resistance (MPa) | | | | | | |
|---|---|---|---|---|---|---|---|---|
| | | 900° C. | 930° C. | 940° C. | 950° C. | 970° C. | 980° C. | 1020° C. | 1030° C. |
| 0% | 985° C. | — | — | — | 120 | — | 90 | — | 80 |
| 5% | 910° C. | — | — | 190 | — | 180 | — | 150 | — |
| 10% | 870° C. | 370 | 320 | — | — | — | 260 | — | — |
| 15% | 820° C. | 500 | 420 | — | — | — | 350 | — | — |

Ti-(4.3 to 4.9)% Al-(4.3 to 4.9)% V-(2.6 to 2.9)% Cr-(4.3 to 4.9)% Mo-(3 to 15)% Fe alloy.

The alloys mentioned above are examples of application of the present invention, but the alloy produced by the present invention is not limited to these. The present invention can be applied to kinds of titanium alloys satisfying conditions of content amount of iron in a range of 3 to 15 mass %.

As explained above, in the present invention, iron-containing titanium alloy having a composition that cannot be produced by a conventional method, in which there is no segregation of iron, and in which strength and hardness are superior, can be efficiently produced at lower cost than in a conventional method.

EXAMPLES

The present invention is further explained in detail by way of Examples and Comparative Examples.

Data of Examples and Comparative Examples were obtained under the following conditions.

1. Raw material
1) 64 alloy powder
   Production method: after performing a HDH method on 64 alloy scrap, it was ground and sifted
   Average particle diameter (d50): 32 μm
2) Iron powder
   Production method: carbonyl iron powder produced by BASF company, CF grade
   Average particle diameter (d50): 4 μm
3) Ratio of content of iron powder versus titanium alloy powder 3 to 15 mass %
4) Mixing
   The 64 alloy powder and iron powder were uniformly mixed by a commercially available mixing device.
2. Pretest
   In order to determine conditions of forming processing, samples were prepared by adding 0%, 5%, 10% and 15% of iron powder to the 64 alloy powder, and deformation resis- From these results, it was obvious that deformation resistance is extremely large in 0% Fe alloy, 5% Fe alloy, 10% Fe alloy and 15% Fe alloy.

3. Formation processing
   Each of the 64 alloy powders and complex powders in which 5% of iron powder was added to the 64 alloy powder was filled in a soft steel capsule and was sealed under vacuum. The forming process was performed on these powder-sealed capsules by an extrusion device owned by Sanyo Special Steel Co., Ltd. Heating was performed for 2 hours, and heating temperature of each is shown in Table 2. Furthermore, temperature differences between the heating temperature and the β transformation temperature are also shown in Table 2.

TABLE 2

| Fe content amount (%) | Heating temperature (° C.) | Difference from the β transformation temperature (° C.) |
|---|---|---|
| 0% | 915 | −70 |
| 5% | 950 | +40 |

4. Treatment of forming processed material
   The capsule remaining on the surface of the titanium alloy material generated by the hot forming process was dissolved and removed by acid washing.
5. Measurement of mechanical characteristics
1) Measurement of tensile strength
   Measuring device maker: Instron
   Measuring device number: tensile testing device 5985 type
2) Observation of crystal structure
   Measuring device name: EPMA
   Measuring device maker: JEOL Ltd
   Number: JXA-8100
3) Distribution of iron in crystal structure
   Measuring device name: EPMA
   Measuring device maker: JEOL Ltd
   Number: JXA-8100

[Example 1/Comparative Example 1] (Effect of Iron Powder Addition/Non Addition)

Mechanical characteristics were investigated both in a case in which iron powder was added to 64 alloy powder and in a case in which the iron powder was not added. As shown in Table 3, it was confirmed that yield strength, tensile strength, and hardness were superior in the case in which the iron powder was added. The iron-added alloy exhibited low elongation, and for this reason, it is considered that the temperature of the forming processing was the β temperature region.

TABLE 3

| Text | Fe content amount (%) | Characteristics ||||
|---|---|---|---|---|---|
| | | Yield strength (MPa) | Tensile strength (MPa) | Elongation (%) | Hardness (HV) |
| Example 1 | 5 | 1,450 | 1,480 | 2.8 | 490 |
| C. Example 1 | 0 | 1,100 | 1,200 | 8.1 | 350 |

[Example 2] (Distribution of Iron Concentration in Titanium Material Produced)

Concentration of each component in the crystal structure of the titanium material produced by the hot forming process in Example 1 was measured by EPMA. An X-ray photograph of each of Ti, Al, V and Fe was obtained. The results are shown in the following. The number shown here means the number of counts in the EPMA, and since sensitivity is different depending on elements, in order to convert the number of counts into concentration, concentration correction coefficients were calculated as shown in Table 4, regarding average number of counts as nominal concentration of each element. Based on the correction coefficient, ratio of existence per a concentration range was measured as shown in Table 5. The minimum concentration and the maximum concentration of each element were as follows.

Ti (Average concentration 85.5%): minimum concentration 78.4% and maximum concentration 93.3%

Al (Average concentration 5.7%): minimum concentration 3.7% and maximum concentration 8.4%

V (Average concentration 3.8%): minimum concentration 2.5% and maximum concentration 5.1%

Fe (Average concentration 5.0%): minimum concentration 0.4% and maximum concentration 9.0%

There is a region of composition that greatly differs from the nominal value of material in a case in which Fe concentration is observed microscopically; however, average value along a length of 500 μm was always within a range of ±20% of average concentration of 5%, even if the 500 μm was freely set. That is, there was no segregation macroscopically.

TABLE 4

| | Ti | Al | V | Fe |
|---|---|---|---|---|
| Count of average value | 4644 | 212 | 480 | 195 |
| Composition of average value (%) | 85.5 | 5.7 | 3.8 | 5 |
| Correction coefficient | 54.3 | 37.2 | 126.3 | 39.0 |

TABLE 5

| Ti || Al || V || Fe ||
|---|---|---|---|---|---|---|---|
| Concentration (%) | Intensity | Concentration (%) | Intensity | Concentration (%) | Intensity | Concentration (%) | Intensity |
| <78.4% | 0% | <3.7% | 0% | <2.5% | 0% | <0.4% | 0% |
| 78.4%~80.1% | 0.1% | 3.7%~4.4% | 0.3% | 2.5%~2.7% | 0.2% | 0.4%~1.0% | 0.1% |
| 80.1%~81.7% | 1.5% | 4.4%~5.0% | 10.6% | 2.7%~3.0% | 0.9% | 1.0%~1.6% | 0.4% |
| 81.7%~83.4% | 9.6% | 5.0%~5.7% | 42.7% | 3.0%~3.3% | 4.5% | 1.6%~2.2% | 1.0% |
| 83.4%~85.1% | 28.1% | 5.7%~6.4% | 35.2% | 3.3%~3.5% | 13.9% | 2.2%~2.8% | 1.9% |
| 85.1%~86.7% | 35.2% | 6.4%~7.0% | 9.9% | 3.5%~3.8% | 25.4% | 2.8%~3.4% | 3.8% |
| 86.7%~88.4% | 19.6% | 7.0%~7.7% | 1.2% | 3.8%~4.0% | 29.0% | 3.4%~4.1% | 9.2% |
| 88.4%~90.0% | 5.2% | 7.7%~8.4% | 0.1% | 4.0%~4.3% | 18.4% | 4.1%~4.7% | 18.9% |
| 90.0%~91.7% | 0.7% | >8.4% | 0.0% | 4.3%~4.5% | 6.2% | 4.7%~5.3% | 25.2% |
| 91.7%~93.3% | 0.1% | | | 4.5%~4.8% | 1.2% | 5.3%~5.9% | 20.8% |
| >93.3% | 0.0% | | | 4.8%~5.1% | 0.2% | 5.9%~6.5% | 11.0% |
| | | | | >5.1% | 0.0% | 6.5%~7.2% | 5.0% |
| | | | | | | 7.2%~7.8% | 1.9% |
| | | | | | | 7.8%~8.4% | 0.6% |
| | | | | | | 8.4%~9.0% | 0.1% |
| | | | | | | >9% | 0% |

[Example 3] (Difference in Cost)

When production cost by a conventional method is regarded as 100, cost by the present invention was 30 to 50 in the case in which titanium alloy material having similar functional characteristics was produced by the present invention, and thus, it was confirmed that the present invention exhibits superior economic effects.

The present invention relates to titanium alloy produced by a powder method and relates to a production method therefor, and in the iron-containing titanium alloy in which the composition cannot be produced by a conventional method, there is no segregation of iron, strength and hardness are superior, and it can be produced in lower cost than in a conventional method.

The invention claimed is:

1. α+β titanium alloy or β titanium alloy consisting of 5.1 to 5.4 mass % of aluminum, 3.4 to 3.6 mass % of vanadium, 10 to 15 mass % of iron, titanium as a remainder and inevitable impurities, wherein a deformation resistance of the titanium alloy at 900 to 980° C. in a compression test is 260 to 500 MPa.

2. α+β titanium alloy or β titanium alloy according to claim 1, wherein the titanium alloy is produced by hot extrusion of titanium alloy powder containing aluminum and vanadium mixed with iron powder, and wherein the titanium alloy powder except for the iron powder is produced by a hydrogenation-dehydrogenation method.

3. α+β titanium alloy or β titanium alloy according to claim 1, wherein an average concentration of iron measured within a 500 um length is always within ±20% of a nominal concentration of the titanium alloy.

4. α+β titanium alloy or β titanium alloy according to claim 2, wherein an average concentration of iron measured within a 500 um length is always within ±20% of a nominal concentration of the titanium alloy.

5. α+β titanium alloy or β titanium alloy, comprising 5.1 to 5.4 mass % of aluminum, 3.4 to 3.6 mass % of vanadium, 10 to 15 mass % of iron, titanium as a remainder and inevitable impurities, wherein a deformation resistance of the titanium alloy at 900 to 980° C. in a compression test is 260 to 500 MPa.

6. α+β titanium alloy or β titanium alloy according to claim 5, wherein the titanium alloy is produced by hot extrusion of titanium alloy powder containing aluminum and vanadium mixed with iron powder, and wherein the titanium alloy powder except for the iron powder is produced by a hydrogenation-dehydrogenation method.

7. α+β titanium alloy or β titanium alloy according to claim 5, wherein an average concentration of iron measured within a 500 um length is always within ±20% of a nominal concentration of the titanium alloy.

8. α+β titanium alloy or β titanium alloy according to claim 6, wherein an average concentration of iron measured within a 500 um length is always within ±20% of a nominal concentration of the titanium alloy.

* * * * *